United States Patent

Chen

[11] Patent Number: 5,847,622
[45] Date of Patent: Dec. 8, 1998

[54] QUADRATURE PHASE SHIFT KEYING MODULATING APPARATUS

[76] Inventor: Juih-Hung Chen, No. 50-1, Chu-Tzu Chiao, Hsin-Hua Chen, Tainan Hsien, Taiwan

[21] Appl. No.: 928,993

[22] Filed: Sep. 12, 1997

[51] Int. Cl.$^6$ ................................................ H04L 27/20
[52] U.S. Cl. .......................... 332/103; 375/281; 375/308
[58] Field of Search ..................... 332/103, 105; 375/279, 281, 308

[56] References Cited

U.S. PATENT DOCUMENTS 4,940,954  7/1990  Aubert et al. ............................ 332/103

*Primary Examiner*—Siegfried H. Grimm
*Attorney, Agent, or Firm*—Christensen O'Connor Johnson & Kindness PLLC

[57] ABSTRACT

A quadrature phase shift keying (QPSK) modulating apparatus includes a bit splitter for dividing a bipolar input bit stream into first and second data streams, first and second binary phase shift keying (BPSK) modulators, and a combiner for combining output signals of the first and second BPSK modulators to obtain a QPSK modulated output. The first BPSK modulator includes a voltage-controlled first electrical source which receives the first data stream, and a first oscillator which includes a first resonator that has a first resonant frequency and that is excited by the first electrical source in response to the first data stream so as to generate a first sine wave output. The second BPSK modulator includes a differentiator which receives the second data stream and which generates impulse signals corresponding thereto, a second electrical source, and a second oscillator which includes a second resonator that has a second resonant frequency equal to the first resonant frequency and that is excited by the second electrical source in response to the impulse signals so as to generate a second sine wave output which is 90° out of phase relative to the first sine wave output when the first and second data streams are the same.

8 Claims, 8 Drawing Sheets

QUADRATURE PHASE SHIFT KEYING MODULATING APPARATUS

BACKGROUND OF THE INVENTION

1. Field of the Invention

The invention relates to a modulator, more particularly to a quadrature phase shift keying (QPSK) modulating apparatus.

2. Description of the Related Art

Referring to FIG. 1, in a conventional QPSK modulating apparatus, the output of a carrier oscillator 1 passes through a 90° phase shifter 2 before being received by a first balanced modulator 3. The output of the carrier oscillator 1 is also received by a second balanced modulator 4. A bit splitter 5 divides the input bit stream d(t) into a first data stream d1(t) that is received by the first balanced modulator 3, and a second data stream d2(t) that is received by the second balanced modulator 4. A linear summer 6 acts as a power combiner for combining the outputs of the first and second balanced modulators 3, 4 so as to produce a QPSK modulated output.

The main drawback of the conventional QPSK modulating apparatus described beforehand resides in that the modulating speed is severely limited by the speed of the balanced modulators. As such, the conventional QPSK modulating apparatus is seldom used in high speed applications. In addition, the conventional QPSK modulating apparatus has a relatively complicated construction.

SUMMARY OF THE INVENTION

Therefore, the object of the present invention is to provide a QPSK modulating apparatus which has a relatively simple construction and which is suited for high speed applications.

Accordingly, the quadrature phase shift keying (QPSK) modulating apparatus of this invention comprises:

- a bit splitter adapted to divide a bipolar input bit stream into first and second data streams;
- a first binary phase shift keying (BPSK) modulator including a voltage-controlled first electrical source connected electrically to the bit splitter so as to receive the first data stream therefrom, and a first oscillator connected electrically to the first electrical source, the first oscillator including a first resonator which has a first resonant frequency and which is excited by the first electrical source in response to the first data stream so as to generate a first sine wave output that changes in phase depending on polarity of data bits in the first data stream;
- a second BPSK modulator including: a differentiator connected electrically to the bit splitter so as to receive the second data stream therefrom, the differentiator generating impulse signals corresponding to data bits in the second data stream; a second electrical source connected electrically to the differentiator; and a second oscillator connected electrically to the second electrical source, the second oscillator including a second resonator which has a second resonant frequency equal to the first resonant frequency and which is excited by the second electrical source in response to the impulse signals so as to generate a second sine wave output that changes in phase depending on polarity of the impulse signals and that is 90° out of phase relative to the first sine wave output when the first and second data streams are the same; and
- a combiner connected electrically to the first and second binary phase shift keying modulators for combining output signals thereof in order to obtain a quadrature phase shift keying modulated output.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
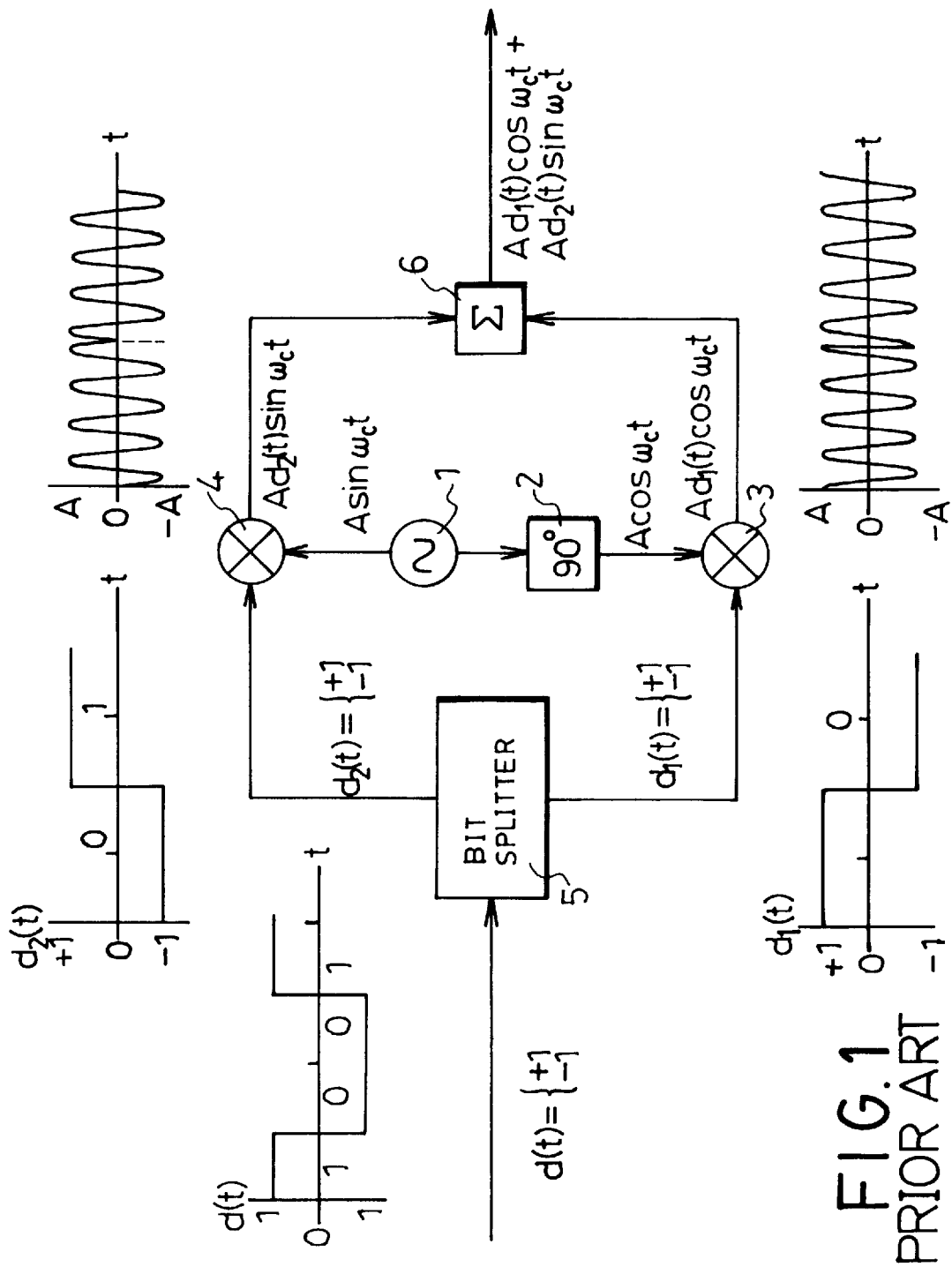
FIG. 1 is a schematic circuit block diagram of a conventional QPSK modulating apparatus.
Figure 2:
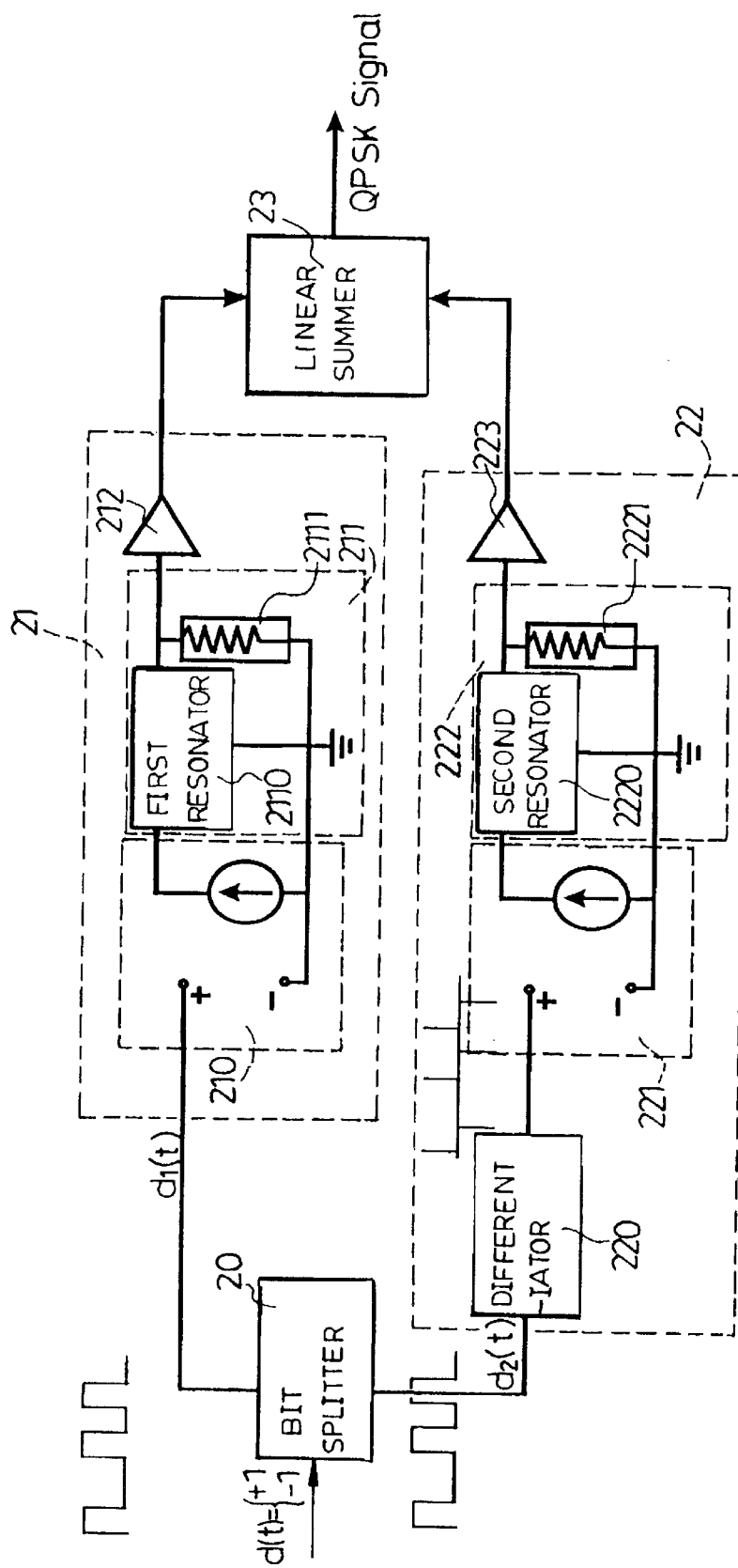
FIG. 2 is a schematic circuit block diagram of the first preferred embodiment of a QPSK modulating apparatus according to the present invention.

Referring to FIG. 2, the first preferred embodiment of a QPSK modulating apparatus according to the present invention is shown to comprise a bit splitter 20, a first binary phase shift keying (BPSK) modulator 21, a second BPSK modulator 22 and a linear summer 23.

The bit splitter 20 is conventional in construction and is adapted to divide a bipolar input bit stream d(t) into first and second data streams d1(t), d2(t).

The first BPSK modulator 21 comprises a voltage-controlled first electrical source 210, a first oscillator 211 and a first amplifier 212.

In this embodiment, the first electrical source 210 is a voltage-controlled current source which is connected electrically to the bit splitter 20 so as to receive the first data stream d1(t) therefrom. The first oscillator 211 is connected electrically to the first electrical source 210, and includes a first resonator 2110 and a first nonlinear impedance device 2111.

Figure 3:
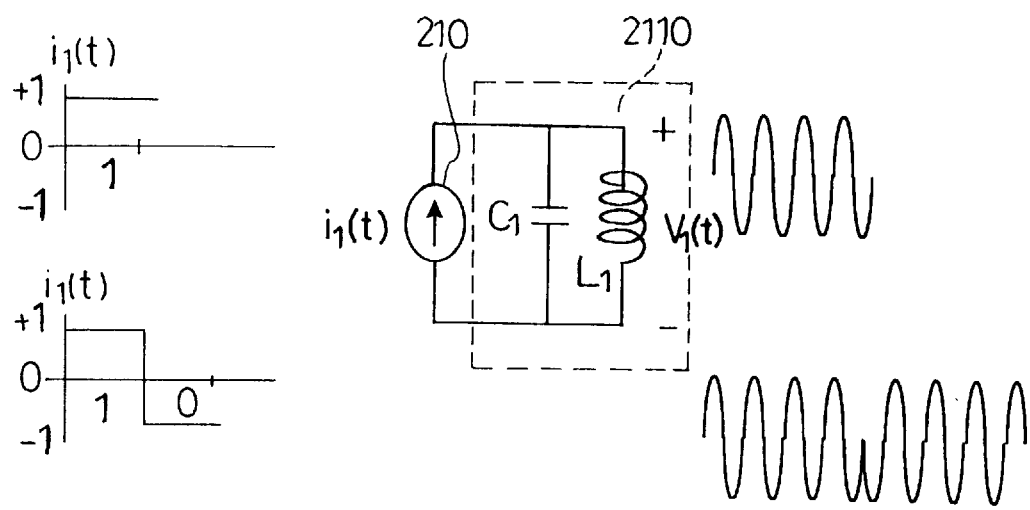
FIG. 3 illustrates the operation of a first binary phase shift keying (BPSK) modulator of the first preferred embodiment.

FIG. 3 illustrates the operation of the first electrical source 210 and the first resonator 2110. As shown, in response to the first data stream which is received thereby, the first electrical source 210 generates an electrical signal i1(t) for exciting the first resonator 2110, which includes a capacitor C1 and an inductor L1 that are connected in parallel. The first resonator 2110 has a first resonant frequency and generates a first sine wave voltage output V1(t) that changes in phase depending on the polarity of the electrical signal i1(t) which, in turn, depends on the polarity of data bits in the first data stream.

Referring again to FIG. 2, the first nonlinear impedance device 2111 is connected across the first resonator 2110 which acts as a limiting device for providing compensation to amplitude loss of the latter. As such, the output signal of the first BPSK modulator 21 can be kept stable at a relatively constant amplitude. Alternatively, a comparator or a limiting amplifier may be employed to achieve the same result.

The first amplifier 212 is connected electrically to the first oscillator 211 and serves to amplify the output of the latter. At the same time, the first amplifier 212 serves as an impedance converter to prevent changes in the load conditions from affecting the frequency of oscillation of the first oscillator 211.

Figure 4:
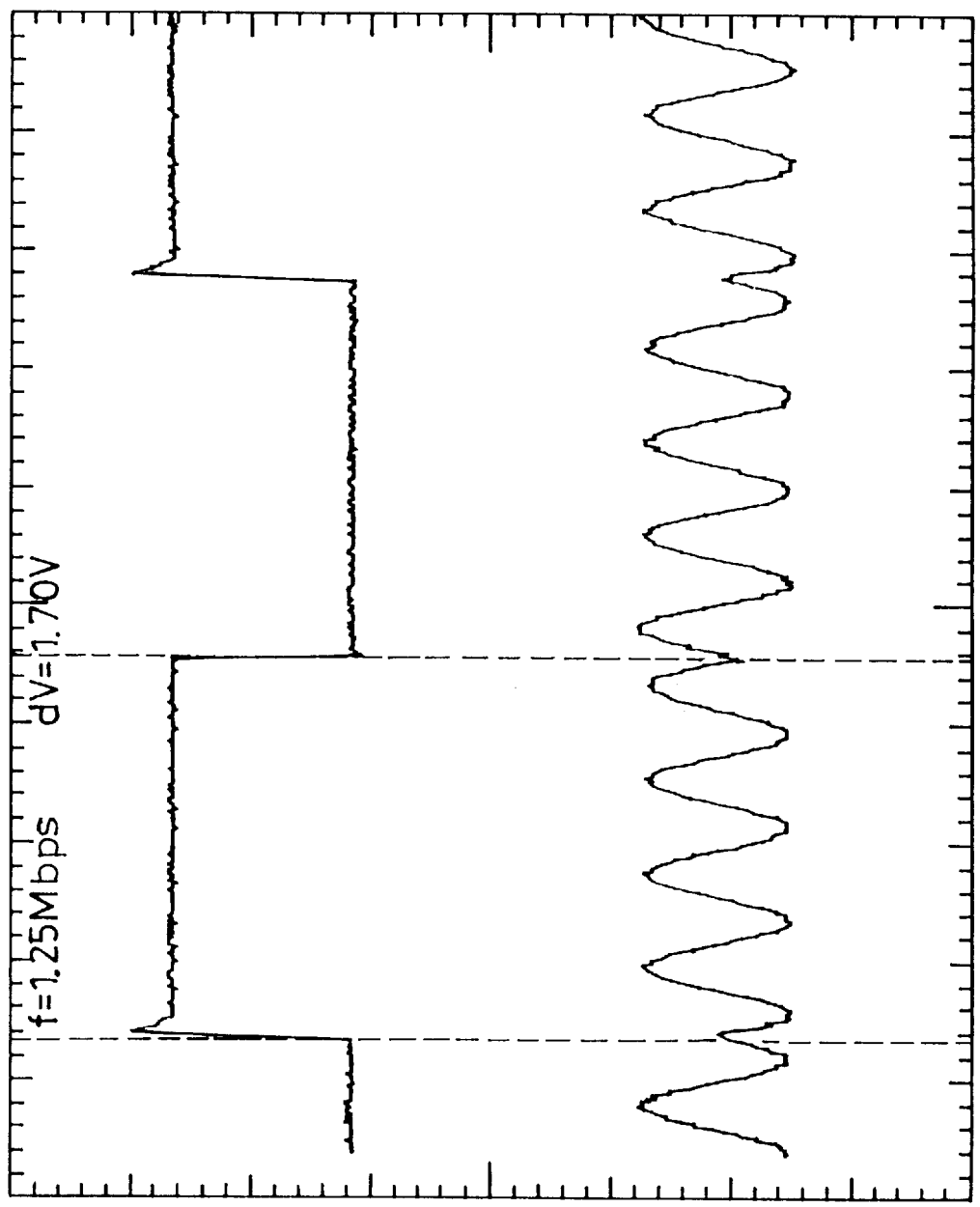
FIG. 4 illustrates input and output waveforms of the first BPSK modulator of the first preferred embodiment.

FIG. 4 illustrates input and output waveforms of the first BPSK modulator 21. As shown, for a bit rate of 1.25 Mbps, the resulting oscillator frequency was detected to be about 5 MHz.

Referring once more to FIG. 2, the second BPSK modulator 22 comprises a differentiator 220, a voltage-controlled second electrical source 221, a second oscillator 222 and a second amplifier 223.

The differentiator 220 is connected electrically to the bit splitter 20 so as to receive the second data stream d2(t) therefrom. The differentiator 220 generates impulse signals corresponding to data bits in the second data stream d2(t).

In this embodiment, the second electrical source 221 is a voltage-controlled current source which is connected electrically to the differentiator 220 so as to receive the impulse signals therefrom. The second oscillator 222 is connected electrically to the second electrical source 221, and includes a second resonator 2220 and a second nonlinear impedance device 2221.

Figure 5:
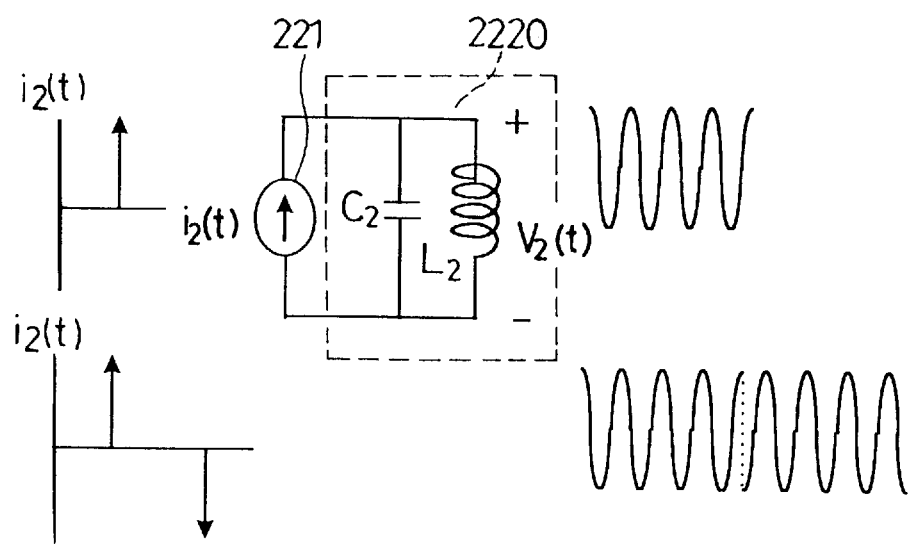
FIG. 5 illustrates the operation of a second BPSK modulator of the first preferred embodiment.

FIG. 5 illustrates the operation of the second electrical source 221 and the second resonator 2220. As shown, in response to the impulse signals from the differentiator 220 (see FIG. 2), the second electrical source 221 generates an impulse current signal i2(t) for exciting the second resonator 2220, which includes a capacitor C2 and an inductor L2 that are connected in parallel. The second resonator 2220 has a second resonant frequency equal to the first resonant frequency of the first resonator 2110, and generates a second sine wave voltage output V2(t) that changes in phase depending on the polarity of the impulse current signal i2(t).

Referring again to FIG. 2, the second nonlinear impedance device 2221 is connected across the second resonator 2220 and acts as a limiting device for providing compensation to amplitude loss of the latter. As such, the output of the second BPSK modulator 22 can be kept stable at a relatively constant amplitude. As with the first BPSK modulator 21, a comparator or a limiting amplifier may be similarly employed in the second BPSK modulator 22 to achieve the same result.

The second amplifier 223 is connected electrically to the second oscillator 222 and serves to amplify the output of the latter. At the same time, the second amplifier 223 serves as an impedance converter to prevent changes in the load conditions from affecting the frequency of oscillation of the second oscillator 222.

Figure 6:
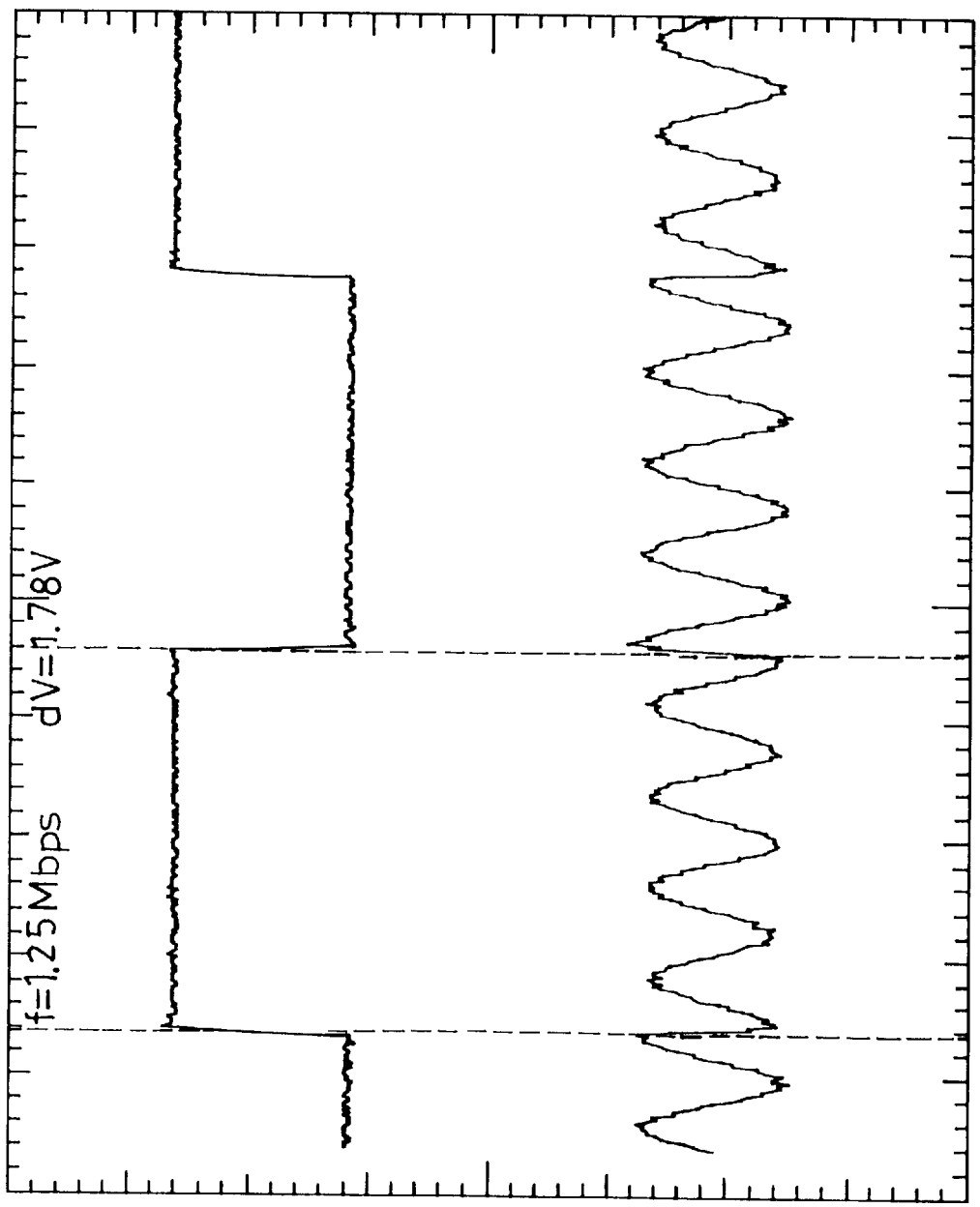
FIG. 6 illustrates input and output waveforms of the second BPSK modulator of the first preferred embodiment.

FIG. 6 illustrates input and output waveforms of the second BPSK modulator 22. As shown, when the input data pattern is the same as that shown in FIG. 4, the output of the second BPSK modulator 22 was found to be 90° out of phase as compared to that of the first BPSK modulator 21 due to the presence of the differentiator 220.

The linear summer 23 is connected electrically to first and second amplifiers 212, 223 of the first and second BPSK modulators 21, 22, and serves as a power combiner for combining the output signals of the same in order to obtain a QPSK modulated output.

Figure 7:
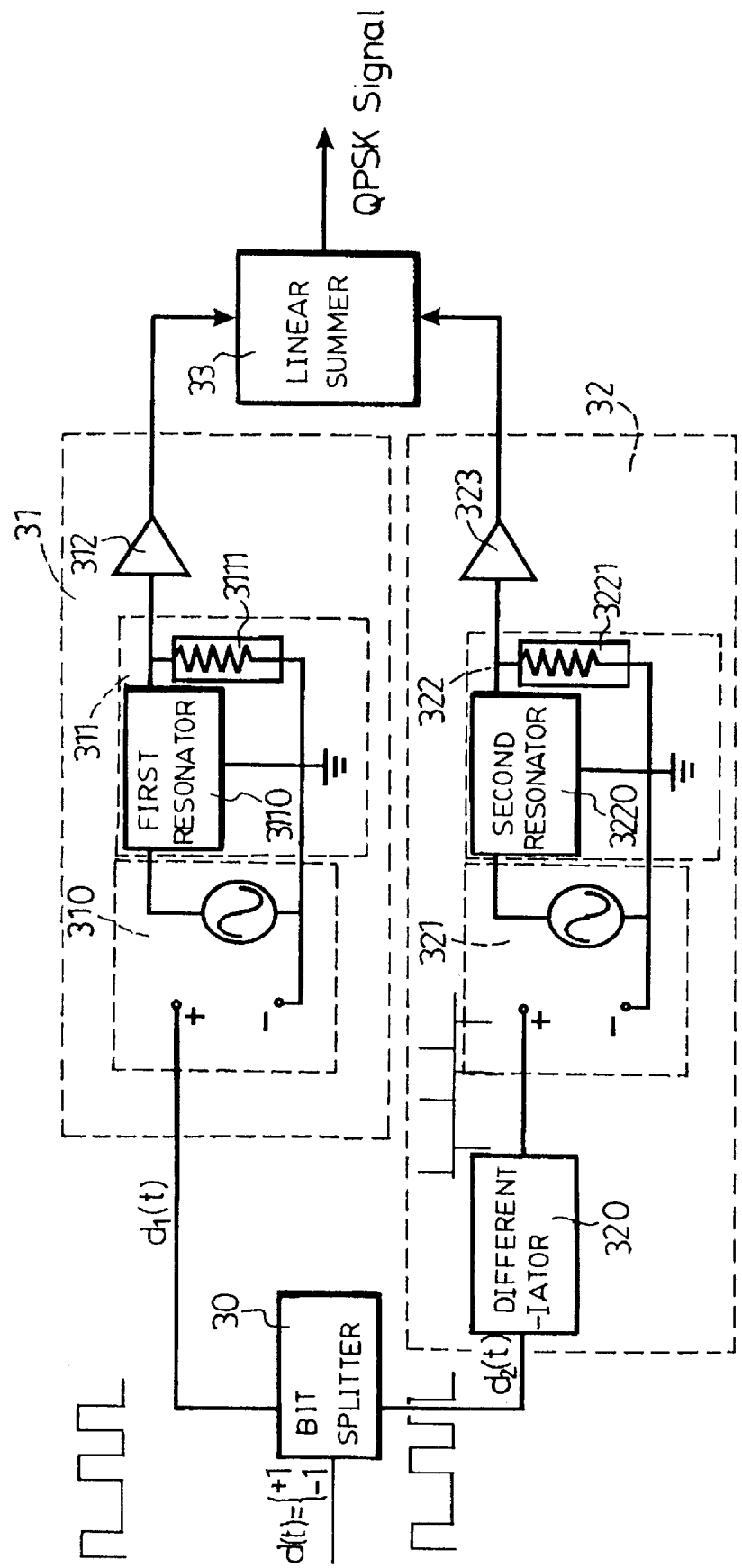
FIG. 7 is a schematic circuit block diagram of the second preferred embodiment of a QPSK modulating apparatus according to the present invention.

Referring to FIG. 7, the second preferred embodiment of a QPSK modulating apparatus according to the present invention is an equivalent circuit of the first preferred embodiment and is shown to similarly comprise a bit splitter 30, a first BPSK modulator 31, a second BPSK modulator 32 and a linear summer 33.

The bit splitter 30 is adapted to divide the bipolar input bit stream d(t) into first and second data streams d1(t), d2(t).

The first BPSK modulator 31 comprises a voltage-controlled first electrical source 310, a first oscillator 311 and a first amplifier 312.

In this embodiment, the first electrical source 310 is a voltage-controlled voltage source which is connected electrically to the bit splitter 30 so as to receive the first data stream d1(t) therefrom. The first oscillator 311 is connected electrically to the first electrical source 310, and includes a first resonator 3110 and a first nonlinear impedance device 3111.

Figure 8:
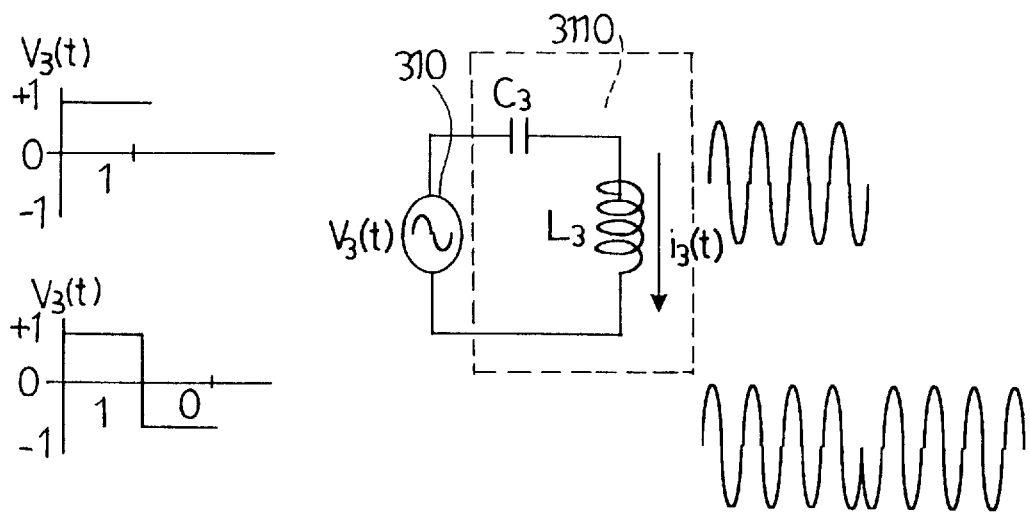
FIG. 8 illustrates the operation of a first BPSK modulator of the second preferred embodiment.

FIG. 8 illustrates the operation of the first electrical source 310 and the first resonator 3110. As shown, in response to the first data stream which was received thereby, the first electrical source 310 generates an electrical signal V3(t) for exciting the first resonator 3110, which includes a capacitor C3 and an inductor L4 that are connected in series. The first resonator 3110 has a first resonant frequency and generates a first sine wave current output i3(t) that changes in phase depending on the polarity of the electrical signal V3(t) which, in turn, depends on the polarity of data bits in the first data stream.

Referring again to FIG. 7, the first nonlinear impedance device 3111 is connected across the first resonator 3110 and serves as a limiting device for providing compensation to amplitude loss of the latter. As such, the output of the first BPSK modulator 31 can be kept stable at a relatively constant amplitude. Alternatively, a comparator or a limiting amplifier may be employed to achieve the same result.

The first amplifier 312 is connected electrically to the first oscillator 311 and serves to amplify the output of the same. At the same time, the first amplifier 312 serves as an impedance converter to prevent changes in the load conditions from affecting the frequency of oscillation of the first oscillator 311.

The second BPSK modulator 32 comprises a differentiator 320, a voltage-controlled second electrical source 321, a second oscillator 322 and a second amplifier 323.

The differentiator 320 is connected electrically to the bit splitter 30 so as to receive the second data stream d2(t) therefrom. The differentiator 320 generates impulse signals that correspond to data bits in the second data stream d2(t).

In this embodiment, the second electrical source 321 is a voltage-controlled voltage source which is connected electrically to the differentiator 320 so as to receive the impulse signals therefrom. The second oscillator 322 is connected electrically to the second electrical source 321, and includes a second resonator 3220 and a second nonlinear impedance device 3221.

Figure 9:
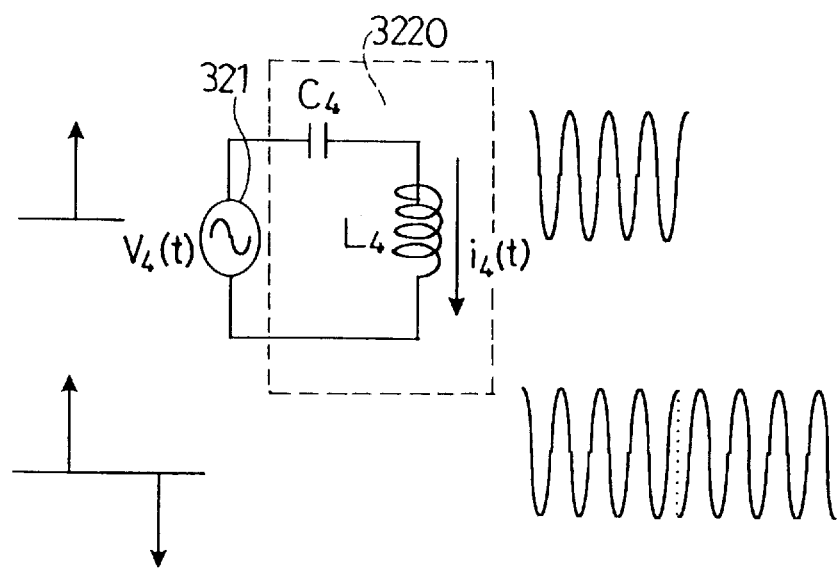
FIG. 9 illustrates the operation of a second BPSK modulator of the second preferred embodiment.

FIG. 9 illustrates the operation of the second electrical source 321 and the second resonator 3220. As shown, in response to the impulse signals from the differentiator 320 (see FIG. 7), the second electrical source 321 generates an impulse voltage signal V4(t) for exciting the second resonator 3220, which includes a capacitor C4 and an inductor L4 that are connected in series. The second resonator 3220 has a second resonant frequency equal to the first resonant frequency of the first resonator 3110, and generates a second sine wave current output i4(t) that changes in phase depending on the polarity of the voltage signal V4(t).

Referring again to FIG. 7, the second nonlinear impedance device 3221 is connected across the second resonator 3220 and serves as a limiting device for providing compensation to amplitude loss of the latter. As such, the output of the second BPSK modulator 32 can be kept stable at a relatively constant amplitude. As with the first BPSK modulator 31, a comparator or a limiting amplifier may be similarly employed in the second BPSK modulator 32 to achieve the same result.

The second amplifier 323 is connected electrically to the second oscillator 322 and serves to amplify the output of the latter. At the same time, the second amplifier 323 serves as an impedance converter to prevent changes in the load conditions from affecting the frequency of oscillation of the second oscillator 322.

Since the second preferred embodiment is an equivalent circuit of the first preferred embodiment, it can be predicted that when the input data patterns to the first and second BPSK modulators 31, 32 are the same, the output of the second BPSK modulator 32 will be 90° out of phase as compared to that of the first BPSK modulator 31.

The linear summer 33 is connected electrically to first and second amplifiers 312, 323 of the first and second BPSK modulators 31, 32, and serves as a power combiner for combining the output signals of the same in order to obtain the QPSK modulated output.

It has thus been shown that the QPSK modulating apparatus of this invention not only has a simple construction but is also suitable for use in high speed applications since it does away with the balanced modulators of the prior art, which can severely limit the modulating speed. In addition, aside from the resonators, all other components of the modulating apparatus of this invention can be fabricated into an integrated circuit. As such, by mere replacement of the resonators, the carrier frequency can be varied as desired to suit the intended application.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A quadrature phase shift keying modulating apparatus, comprising:

a bit splitter adapted to divide a bipolar input bit stream into first and second data streams;

a first binary phase shift keying modulator including a voltage-controlled first electrical source connected electrically to said bit splitter so as to receive the first data stream therefrom, and a first oscillator connected electrically to said first electrical source, said first oscillator including a first resonator which has a first resonant frequency and which is excited by said first electrical source in response to the first data stream so as to generate a first sine wave output that changes in phase depending on polarity of data bits in the first data stream;

a second binary phase shift keying modulator including: a differentiator connected electrically to said bit splitter so as to receive the second data stream therefrom, said differentiator generating impulse signals corresponding to the second data stream; a second electrical source connected electrically to said differentiator; and a second oscillator connected electrically to said second electrical source, said second oscillator including a second resonator which has a second resonant frequency equal to the first resonant frequency and which is excited by said second electrical source in response to the impulse signals so as to generate a second sine wave output that changes in phase depending on polarity of the impulse signals and that is 90° out of phase relative to the first sine wave output when the first and second data streams are the same; and a combiner connected electrically to said first and second binary phase shift keying modulators for combining output signals thereof in order to obtain a quadrature phase shift keying modulated output.

2. The quadrature phase shift keying modulating apparatus according to claim 1, wherein each of said first and second electrical sources is a voltage-controlled current source.

3. The quadrature phase shift keying modulating apparatus according to claim 1, wherein each of said first and second resonators includes a capacitor and an inductor that are connected in parallel.

4. The quadrature phase shift keying modulating apparatus according to claim 1, wherein each of said first and second electrical sources is a voltage-controlled voltage source.

5. The quadrature phase shift keying modulating apparatus according to claim 1, wherein each of said first and second resonators includes a capacitor and an inductor that are connected in series.

6. The quadrature phase shift keying modulating apparatus according to claim 1, wherein each of said first and second oscillators further includes a limiting device connected to a respective one of said first and second resonators to keep the output signals of said first and second binary phase shift keying modulators stable at a relatively constant amplitude.

7. The quadrature phase shift keying modulating apparatus according to claim 6, wherein said limiting device includes a nonlinear impedance device.

8. The quadrature phase shift keying modulating apparatus according to claim 1, wherein each of said first and second binary phase shift keying modulators further includes an amplifier which interconnects electrically a respective one of said first and second oscillators and said combiner, said amplifier amplifying a respective one of the first and second sine wave outputs and preventing changes in load conditions from affecting frequency of oscillation of the respective one of said first and second oscillators.

\* \* \* \* \*

UNITED STATES PATENT AND TRADEMARK OFFICE
CERTIFICATE OF CORRECTION

PATENT NO. : 5,847,622
DATED : December 8, 1998
INVENTOR(S) : J.-H. Chen

It is certified that error appears in the above-identified patent and that said Letters Patent is hereby corrected as shown below:

Title page,
Item [76], Inventor, "Juih-Hung Chen," should read -- Juin-Hung Chen, --

Signed and Sealed this

Eighteenth Day of December, 2001

Attest:

JAMES E. ROGAN
*Attesting Officer*   *Director of the United States Patent and Trademark Office*